US008634304B2

(12) United States Patent
Motter et al.

(10) Patent No.: US 8,634,304 B2
(45) Date of Patent: Jan. 21, 2014

(54) ETHERNET TEST-SET CABLE

(75) Inventors: Jeffrey Motter, Plano, TX (US); Steven Franks, Garland, TX (US); Michael Pollock, Sachse, TX (US); Don Bodge, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1125 days.

(21) Appl. No.: 12/604,870

(22) Filed: Oct. 23, 2009

(65) Prior Publication Data

US 2011/0095767 A1 Apr. 28, 2011

(51) Int. Cl.
*G01R 31/08* (2006.01)

(52) U.S. Cl.
USPC .......... 370/241; 324/539; 174/33; 174/113 R; 370/242; 370/247; 370/249; 370/251

(58) Field of Classification Search
USPC ......... 370/241–253; 324/539; 174/33, 113 R; 372/38
See application file for complete search history.

(56) References Cited

U.S. PATENT DOCUMENTS

2008/0222312 A1* 9/2008 Simanonis ...................... 710/10
2009/0083550 A1* 3/2009 Diab ............................ 713/300
2009/0279554 A1* 11/2009 Kastner et al. ................ 370/400

OTHER PUBLICATIONS

Andrew, Howto: Two Network Connections on a Single CAT5 Cable, Sep. 2009.*

* cited by examiner

*Primary Examiner* — Mark Rinehart
*Assistant Examiner* — Mang Yeung

(57) ABSTRACT

An Ethernet cable used with an Ethernet test-set allows a single connection to an Ethernet port of a network element while maintaining individual connections to separate ports on the test-set. The far-end of the signal path is a single Ethernet cable port having its transmit and receive pins interconnected. The far-end port interconnections cause a test signal which has traveled to the far-end port to be returned to the test-set and to be receive in a test-set port other than the originating port Two signal paths can be simultaneously tested with the same test-kit. Interconnections between the test-set ports by way of the cable maintain a "no-signal" alarm disabled, which otherwise would be energized because there is no signal being received in the port from which the test signal originated.

22 Claims, 7 Drawing Sheets

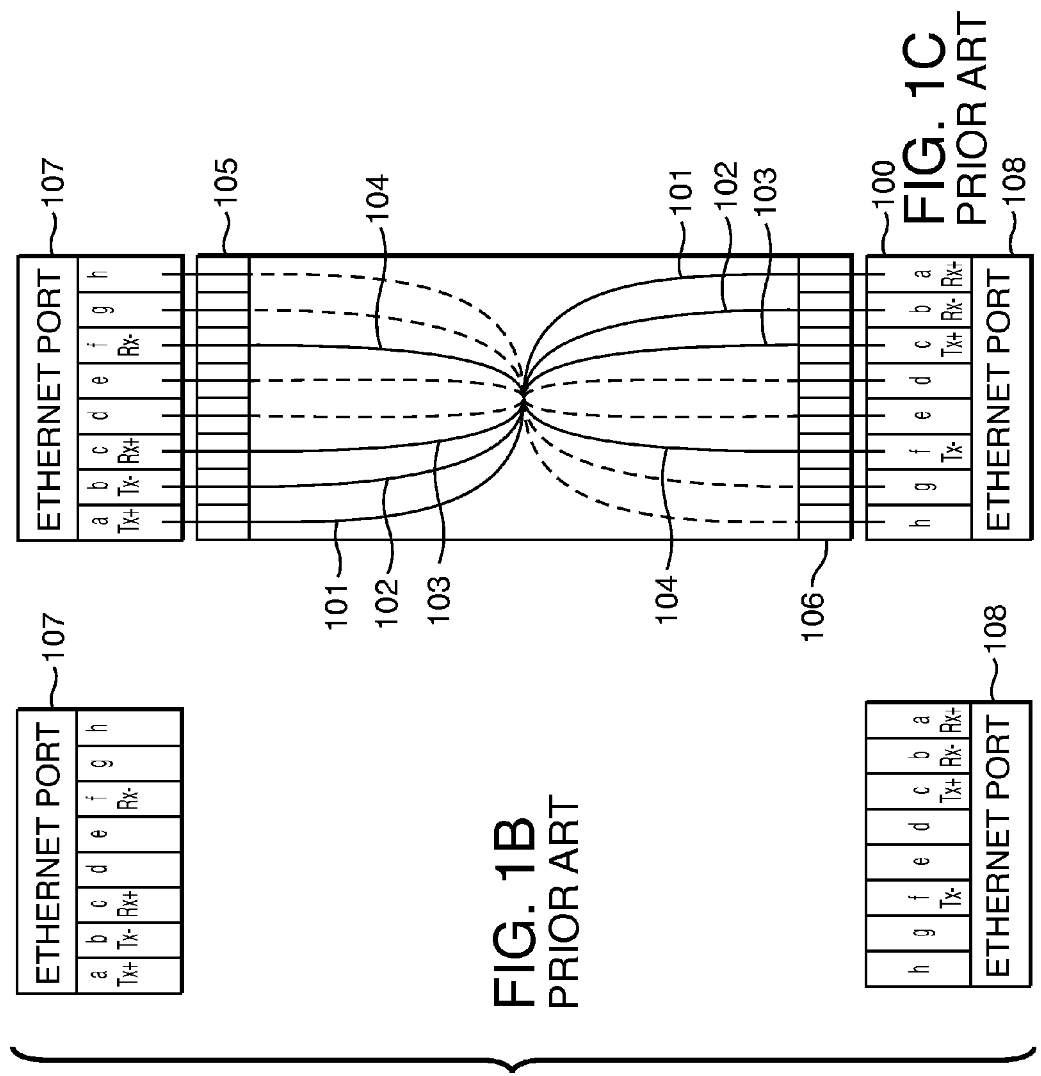
FIG. 1C
PRIOR ART
FIG. 1B
PRIOR ART
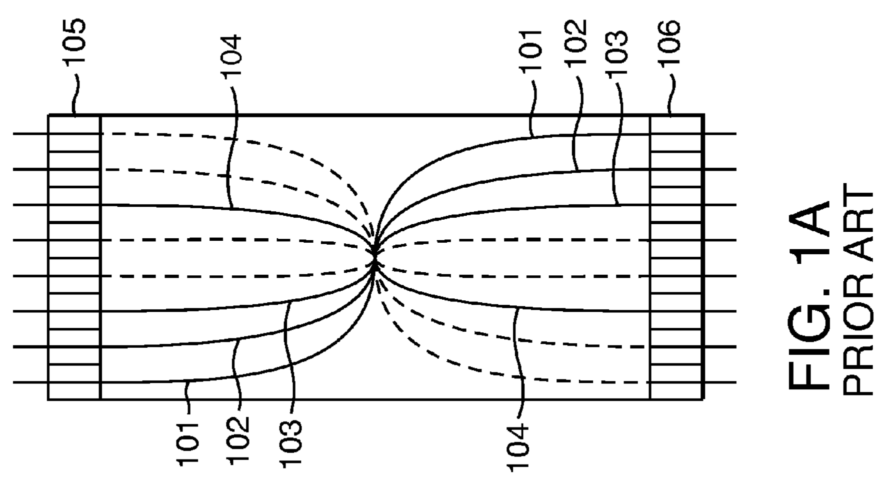
FIG. 1A
PRIOR ART

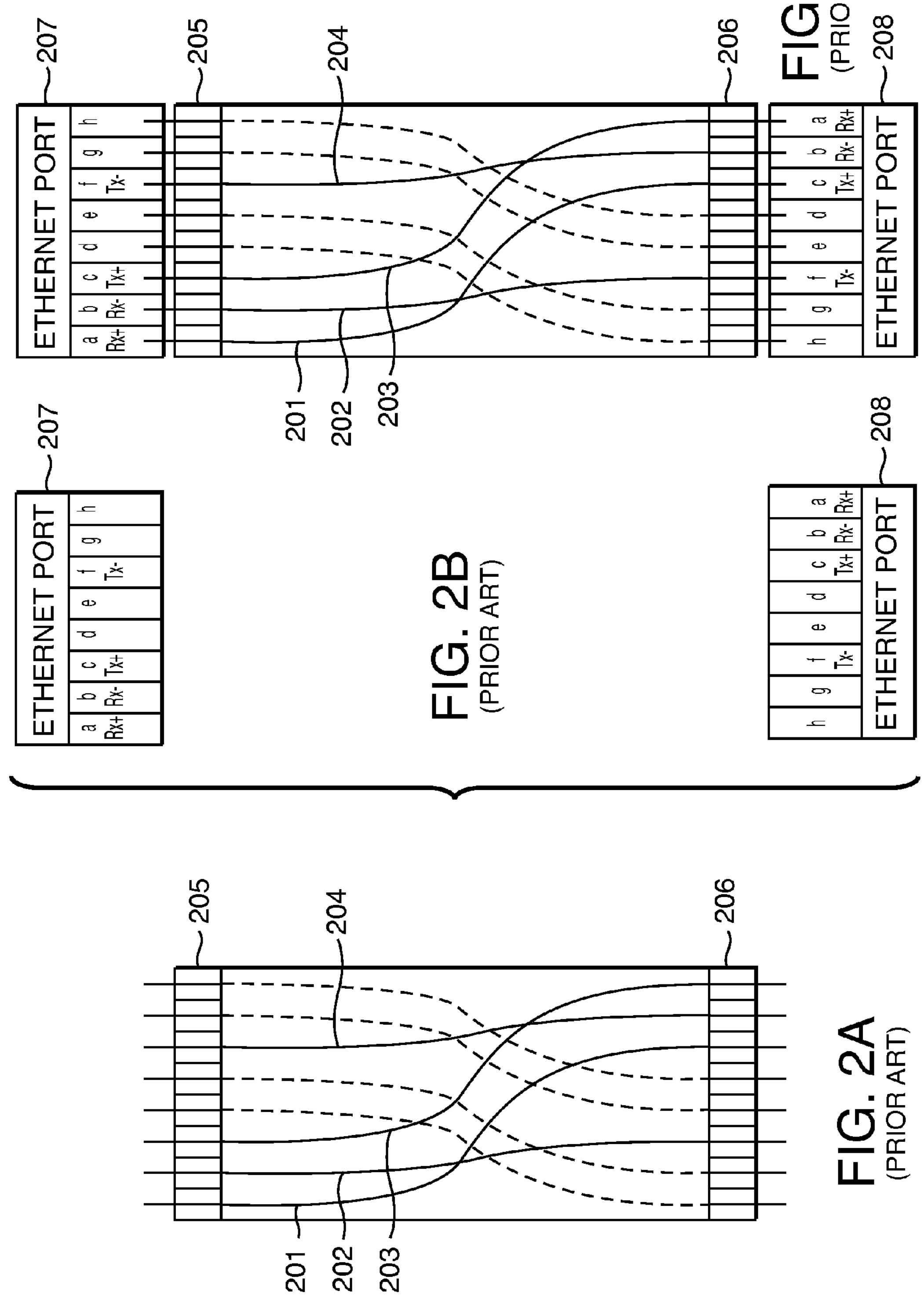
ETHERNET PORT
a b c d e f g h
Rx+ Rx- Tx+ Tx-
207
205
204
206
208
201
202
203
FIG. 2C
(PRIOR ART)
FIG. 2B
(PRIOR ART)
FIG. 2A
(PRIOR ART)

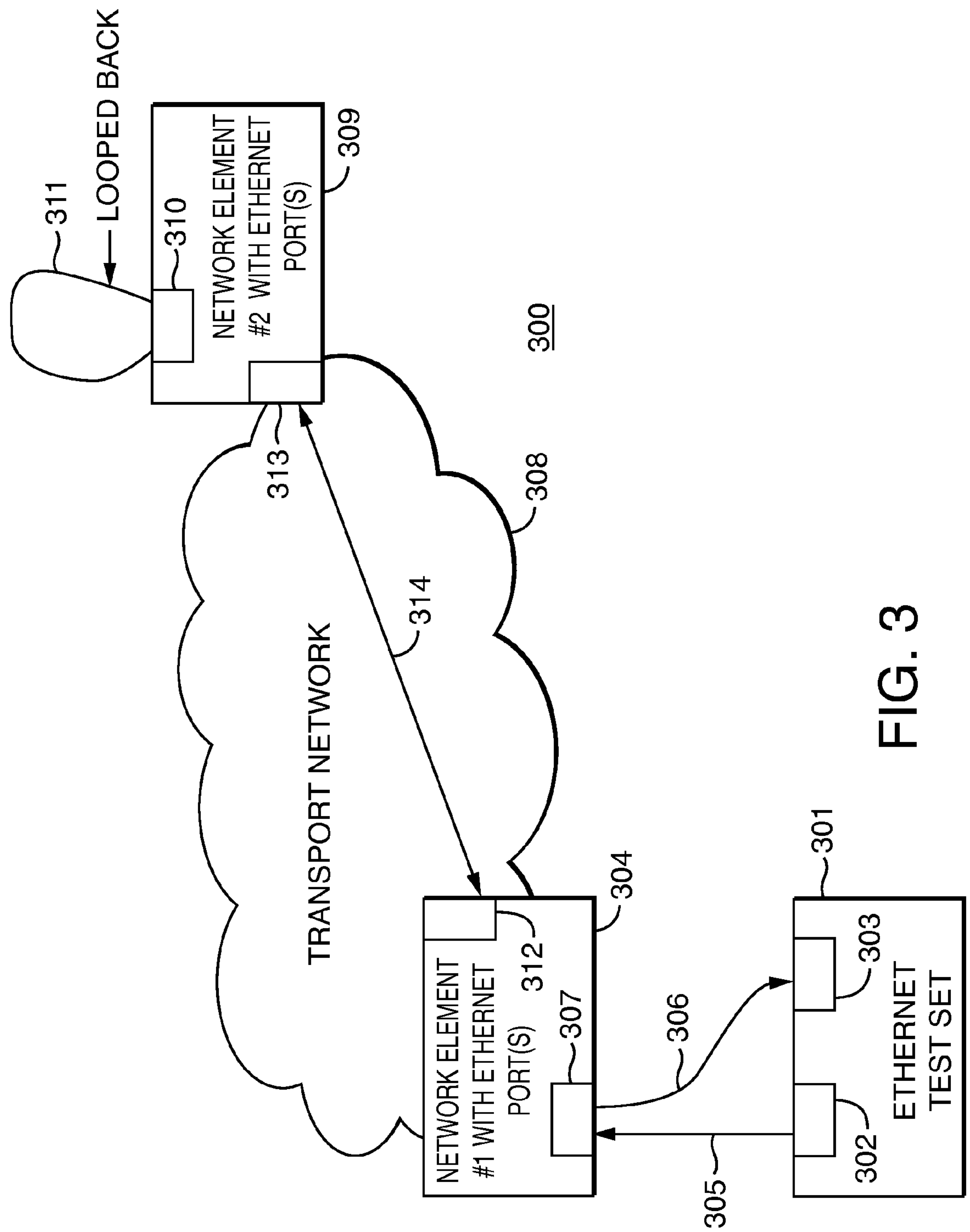
FIG. 3

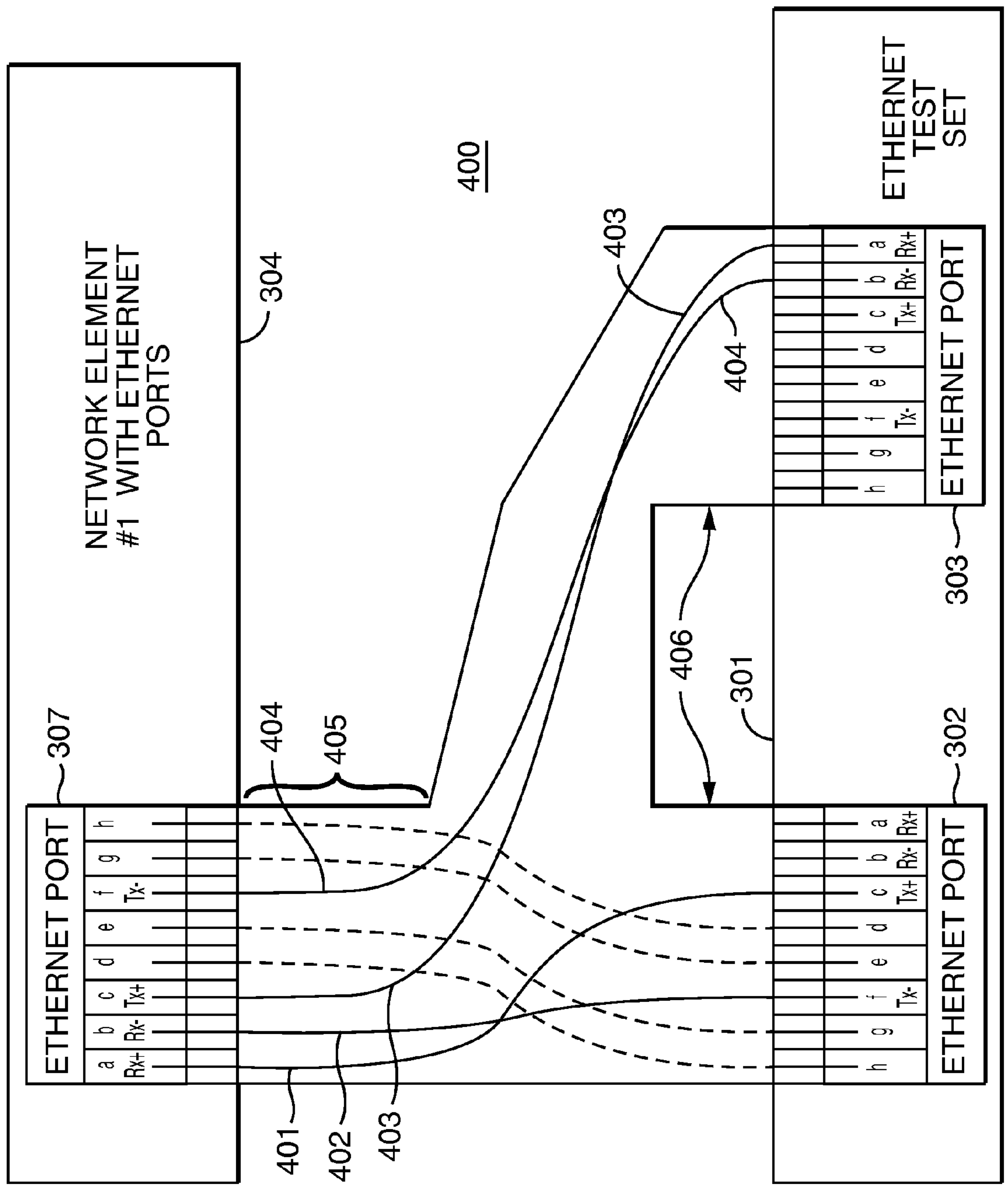
FIG. 4
400
NETWORK ELEMENT #1 WITH ETHERNET PORTS
ETHERNET TEST SET
ETHERNET PORT
ETHERNET PORT
ETHERNET PORT
a b c d e f g h
Rx+ Rx- Tx+ Tx-
304
307
403
404
405
406
301
302
303
401
402
403
404

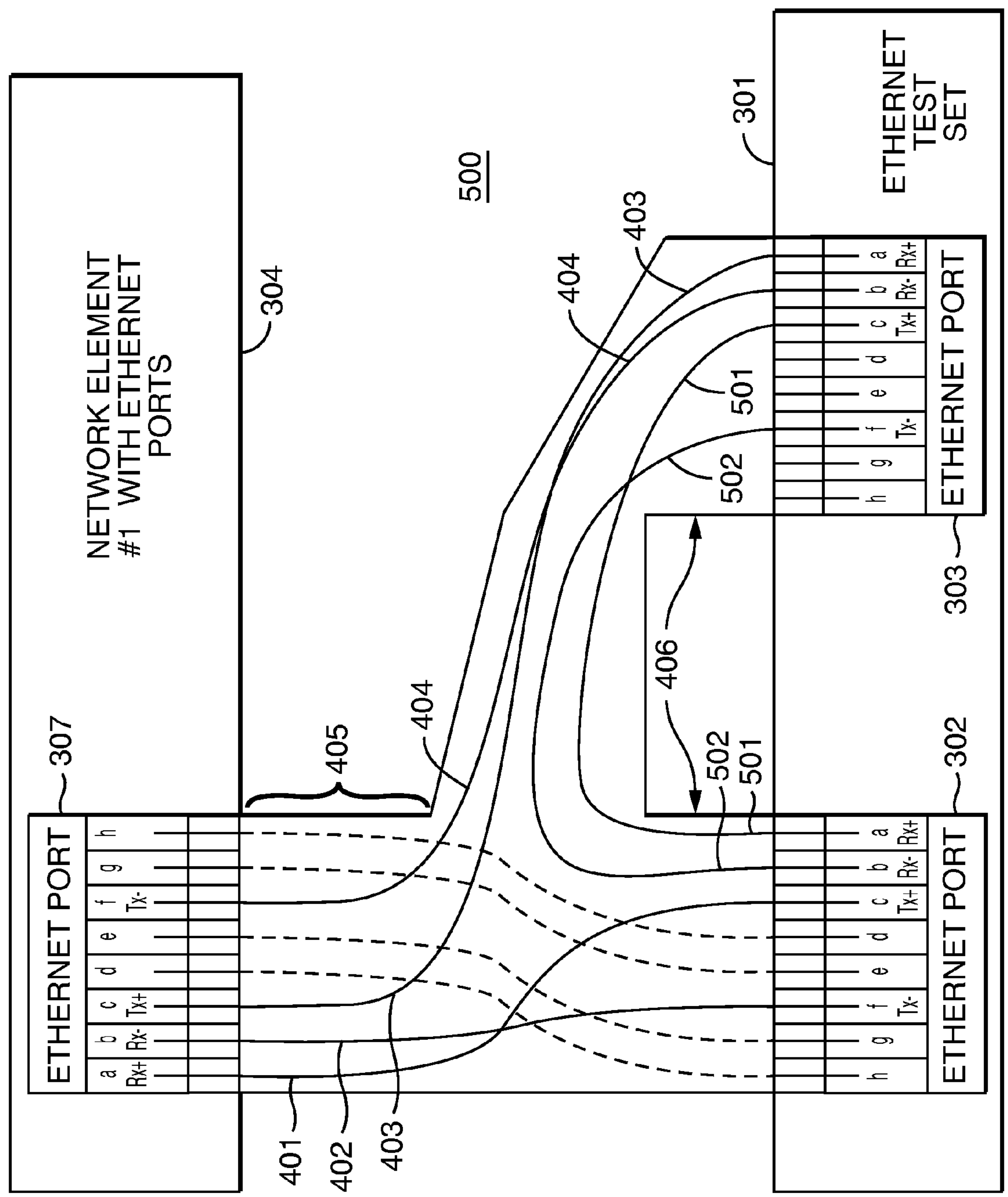
FIG. 5

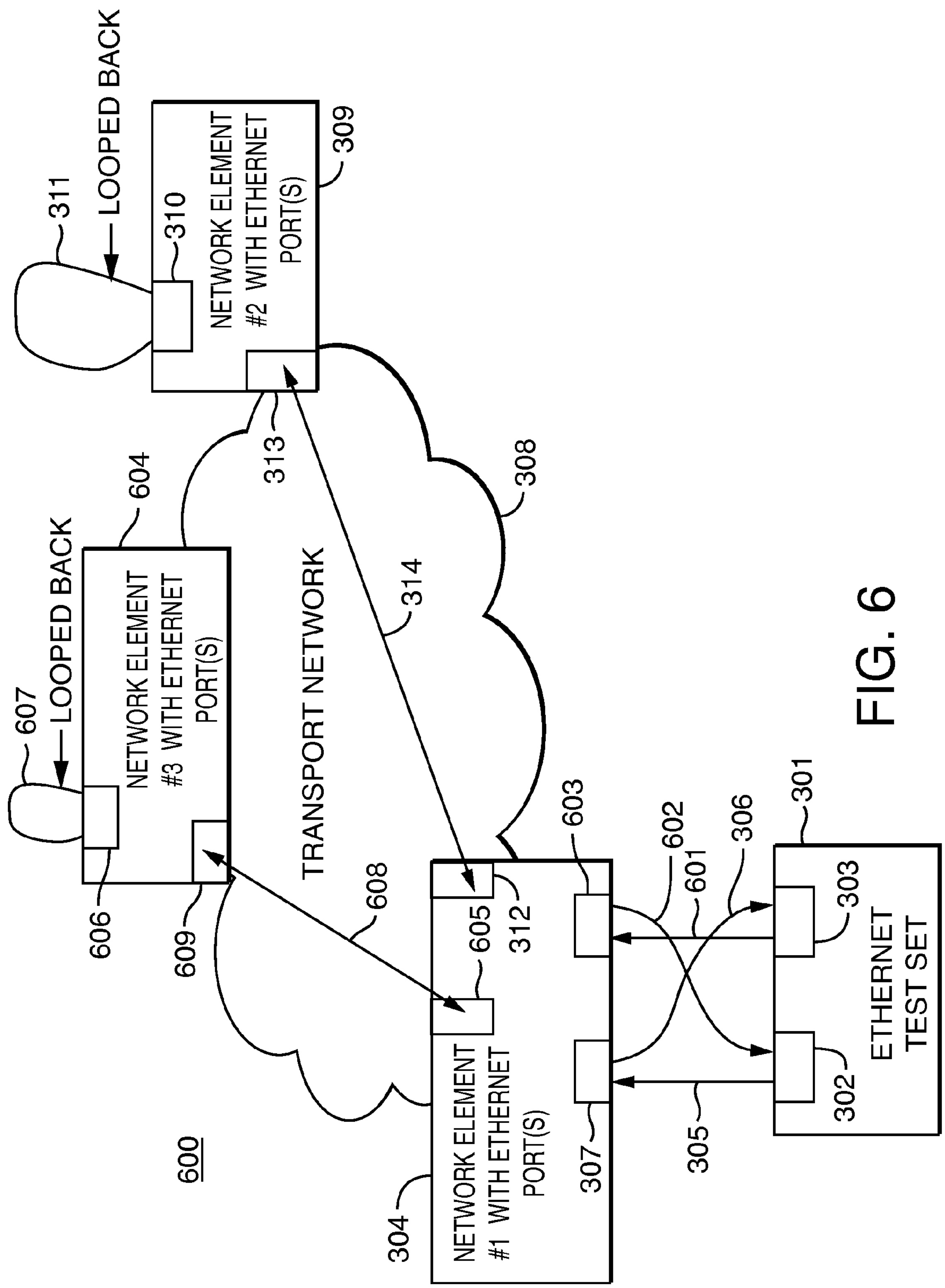
FIG. 6

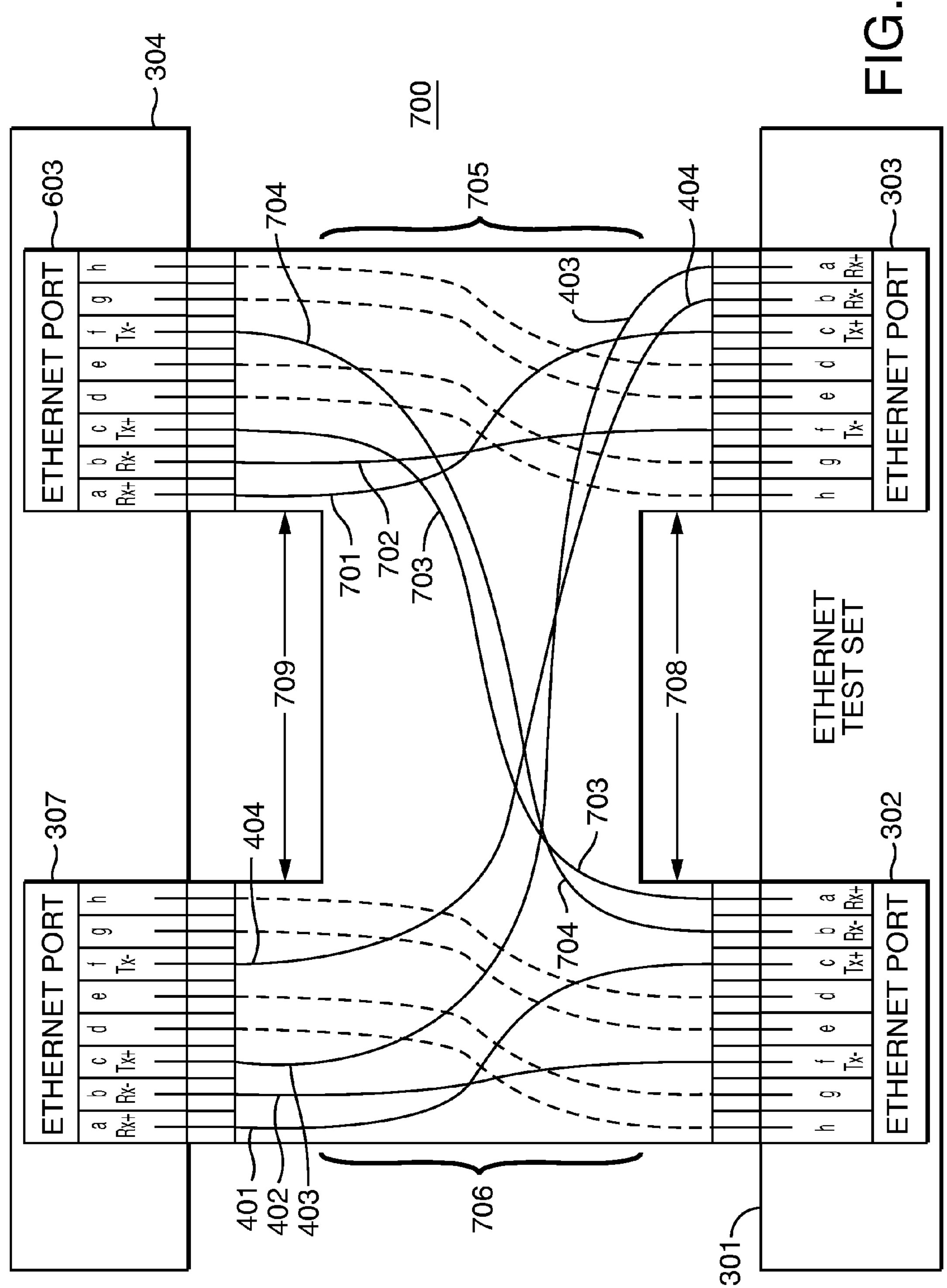
FIG. 7

ETHERNET TEST-SET CABLE

BACKGROUND

Ethernet cables and the familiar RJ-45 Ethernet plugs and jacks that terminate these cables are standard communication links for computer systems, telecommunications systems, etc. These links need to be tested, particularly, in telecommunications applications, where they can be made over very long distances, e.g., spanning the United States and beyond, when they are interspersed with non-Ethernet links, such as, e.g., optical links. Therefore, Ethernet cable testing is critical to pre-determine that all Ethernet cable connections are good in a given communication path through one or more networks.

After that determination is made, a suite of tests can be run, such as those in accordance with International Telecommunications Union Request for Comments 2544 (ITU-RFC-2544). These tests can determine various parameters for that total communication path including its Ethernet cable connections, such as throughput (to determine the quantity of traffic that can be handled), latency (to determine how long it takes to send a signal round-trip), frame loss (to determine if buffers can handle the traffic load without dropping frames), etc.

To this end, Ethernet test-sets, which can be configured as hand-held devices, are commercially available. To determine if the Ethernet connections are good, test signals are sent out from one Ethernet port in the test-set and make a round trip back to the test-set. But, in accordance with the design of these test-sets, the returned test signal cannot be received or accepted in the same test-set port from which the signal was sent. A second Ethernet port is available on the test-set to accept the return signal. Therefore, a dedicated return path connecting to this second Ethernet port must be provided, if that is possible to do under the particular testing constraints involved in a particular test. When the distances involved are great, a separate, dedicated Ethernet cable return path is usually not feasible.

Moreover, if there is only one Ethernet port in the network node/element at the far-end of the test path available for test purposes, a separate, dedicated return path would then be unavailable. If a technician jumpers the test signal within the pins of that one available Ethernet port (from transmit pins to receive pins) to return the test signal to the test-set along a path similar to that from which it came, the test fails because the signal ultimately returns to the same Ethernet port on the test-set from which it was sent which is not accepted by the test-sets.

BRIEF DESCRIPTION OF THE DRAWINGS

FIGS. 1A, 1B and 1C are schematic diagrams of a commercially-available Ethernet straight through cable as it would appear disassembled in FIGS. 1A and 1B, and assembled in FIG. 1C with standard straight through RJ-45 connectors on each end;

FIGS. 2A, 2B and 2C are schematic diagrams of a commercially-available Ethernet crossover cable as it would appear disassembled in FIGS. 2A and 2B, and assembled in FIG. 2C with standard crossover RJ-45 connectors on each end;

FIG. 3 is a schematic diagram of an exemplary arrangement of network elements under test in relation to an Ethernet test-set;

FIG. 4 is a schematic diagram of detailed wiring interconnections in a novel Ethernet cable of the type used in the arrangement of FIG. 3;

FIG. 5 is a schematic diagram of detailed wiring interconnections in a cable as shown in FIG. 4 but with additional inter-connections between ports of an Ethernet cable tester to disengage a no-signal alarm;

FIG. 6 is a schematic diagram of another exemplary arrangement of network elements under test in relation to an Ethernet test-set and with which another exemplary embodiment; and FIG. 7 is a schematic diagram of detailed wiring interconnections in a novel Ethernet cable of the type used in the arrangement of FIG. 6.

DETAILED DESCRIPTION OF PREFERRED EMBODIMENTS

In this description, unless otherwise noted, if the same reference numeral is used in different Figs. it refers to the same entity. Otherwise, reference numerals of each Fig. start with the same number as the number of that Fig. For example, FIG. 3 has reference numerals in the "300" category and FIG. 4 has reference numerals in the "400" category, etc. Also, when the term "signal" is used, it is intended to include the plural "signals" if there is more than one electrical conductor involved in transmitting or receiving signals. Similarly when the term "path" is used, it is intended to include the plural "paths" if there is more than one signal, such as a positive polarity signal and a negative polarity signal, being transmitted and received along such path or paths.

In overview, exemplary embodiments of the claimed subject matter relate to Ethernet test-set cables or methods for testing Ethernet cables and their connections. In a first exemplary embodiment, a method is provided for testing Ethernet cables and their connections. The method comprises connecting one end of an Ethernet cable to an Ethernet port of a first network element which is connected to other network elements over a network and connecting two other ends of the Ethernet cable to two Ethernet ports, respectively, of an Ethernet test-set which controls the testing. Thereafter, a test signal is sent from one of the two Ethernet ports over the cable to the Ethernet port of the first network element; and a return test signal is received from the Ethernet port of the first network element over the cable in the other of the two Ethernet ports in the Ethernet test-set.

In a second exemplary embodiment, the cable includes first mutually-insulated conductive paths interconnecting a first Ethernet port of an Ethernet test-set and a first Ethernet port of a first network element. There are also second mutually-insulated conductive paths, sheathed together with the first mutually-insulated conductive paths within the cable, interconnecting the first Ethernet port of the first network element to a second Ethernet port of the Ethernet test-set. In a further feature, the transmit pins in the second Ethernet port in the Ethernet test-set can be connected, within the cable, to the receive pins in the first Ethernet port in the Ethernet test-set to prevent the energizing of a no-signal alarm which otherwise would be triggered by the test-set.

In a third exemplary embodiment, the cable also includes third mutually-insulated conductive paths interconnecting the second Ethernet port of the Ethernet test-set and a second Ethernet port of the first network element. In addition there are also fourth mutually-insulated conductive paths interconnecting the second Ethernet port of the first network element to the first Ethernet port of the Ethernet test-set. In addition, the first conductive paths, the second conductive paths, the third conductive paths and the fourth conductive paths are sheathed together within the protective exterior of the cable for the entire length of the cable connecting the two ports of the first network element to the two ports of the Ethernet test-set, except for a branching of the cable into two cables at both ends of the cable for connecting to the two ports of the network element and the two ports of the Ethernet test-set.

In a fourth exemplary embodiment, the testing method includes transmitting a first test signal from a first Ethernet port of an Ethernet test-set to a first Ethernet port of a first network element within an Ethernet cable over first mutually insulated conductive paths. Then, the first test signal is transmitted from the first network element to a second network element along a first test signal path, the second network element including a far-end Ethernet port with jumpered transmit to receive pins, the far-end port returning the first test signal to the first network element along a second test signal path, where the first and second paths together include Ethernet cables and connections. Then, the method includes returning the first test signal from the first Ethernet port of the first network element to a second Ethernet port of the Ethernet test-set over second mutually insulated conductive paths that are bundled together with the first mutually insulated conductive paths within the cable for the entire length of the cable except for an end of the cable which is unbundled into two cables at the location of the Ethernet test-set.

Ethernet ports using RJ-45 connectors can be so-called "straight through cable" connectors or "crossover" connectors. Standard straight-through cable wiring must be used between certain pairs of network entities such as, e.g., between a personal computer (PC) and a network hub or switch. Likewise, standard crossover cable wiring must be used between other certain pairs of network entities such as, e.g., between a first PC and a second PC or between a first hub and a second hub or between a first switch and a second switch.

FIGS. 1A, 1B and 1C are schematic diagrams of a commercially-available Ethernet straight through cable as it would appear disassembled and assembled with standard straight through Ethernet RJ-45 connectors on each end. In FIG. 1A, only the straight-through cable is depicted. The solid lines 101, 102, 103 and 104 represent conductive paths that connect from pins in Ethernet connector plug 105 at the top of the sketch to other pins in Ethernet connector plug 106 at the bottom of the sketch. The dotted lines represent possible connections between other pins in both connector plugs but which are not being used, at least in this application.

In FIG. 1B, two Ethernet ports 107 and 108 are shown, each including an Ethernet jack having eight mutually-insulated and conductive pins labeled a, b, c, d, e, f, g and h respectively. Alternatively, they could be labeled by the numbers "1" through "8" consecutively. In port 107 at the upper area of FIG. 1B, the pins are labeled from left to right but in port 108 at the lower area of FIG. 1B they are shown as being labeled from right to left where the direction of the labeling is immaterial. In port 107, pin "a" is associated with the Tx+ signal standing for positive polarity signal transmission; pin "b" is associated with the Tx− signal standing for negative polarity signal transmission; pin "c" is associated with the Rx+ signal standing for positive polarity signal reception; and pin "f" is associated with the Rx− signal standing for negative polarity signal reception. But, the Ethernet jack associated with Ethernet port 108 has a complementary association between signals and pin labels compared with those in port 107; for port 108, pin "a" goes with Rx+, pin "b" goes with Rx−, pin "c" goes with Tx+ and pin "f" goes with Tx−, thereby enabling a "straight through" connection between like-designated pins, as explained in the next paragraph.

In FIG. 1C, the cable from FIG. 1A is shown assembled with the ports from FIG. 1B. As can be seen in FIG. 1C, in one direction, conductive path 101 connects a positive polarity signal transmitted (Tx+) from pin "a" of port 107 to pin "a" of port 108 where it is received (Rx+). Conductive path 102 connects a negative polarity signal transmitted (Tx−) from pin "b" of port 107 to pin "b" of port 108 where it is received (Rx−). In the reverse direction, conductive path 103 connects a positive polarity signal transmitted (Tx+) from pin "c" of port 108 to pin "c" of port 107 where it is received (Rx+). And, conductive path 104 connects a negative polarity signal transmitted (Tx−) from pin "f" of port 108 to pin "f" of port 107 where it is received (Rx−). Because all of these connections are between the same pin designations in the two connectors ("a" to "a", "b" to "b" etc.) this is known as a "straight through" Ethernet cable and RJ-45 connector. It matters not if the wiring actually twists within the cable, as shown, or if the cable itself twists, as long as the pin connections for each of the wires within that cable are from pin "a" to pin "a" etc., as explained herein.

FIGS. 2A, 2B and 2C are schematic diagrams of a commercially-available Ethernet crossover cable as it would appear disassembled and assembled with standard crossover RJ-45 connectors on each end. In FIG. 2A, only the crossover cable is depicted. The solid lines 201, 202, 203 and 204 represent conductive paths that connect from pins in Ethernet connector plug 205 at the top of the sketch to other pins in Ethernet connector plug 206 at the bottom of the sketch. The dotted lines represent possible connections between other pins in both connector plugs but which are not being used, at least in this application.

In FIG. 2B, two Ethernet ports 207 and 208 are shown, each including an Ethernet jack having eight mutually-insulated and conductive pins labeled a, b, c, d, e, f, g and h respectively. Alternatively, they could be labeled by the numbers "1" through "8" consecutively. In port 207 at the upper area of FIG. 2B, the pins are labeled from left to right but in port 208 at the lower area of FIG. 2B they are shown as being labeled from right to left where the direction of the labeling is immaterial. In port 207, pin "a" is associated with the Rx+ signal standing for positive polarity signal reception; pin "b" is associated with the Rx− signal standing for negative polarity signal reception; pin "c" is associated with the Tx+ signal standing for positive polarity signal transmission; and pin "f" is associated with the Tx− signal standing for negative polarity signal transmission. In this crossover cable instance, the Ethernet jack associated with Ethernet port 208 has an association between signals and pin labels identical to that in port 207, where its pin "a" also goes with Rx+, pin "b" also goes with Rx−, pin "c" also goes with Tx+ and pin "d" also goes with Tx−. This represents a different usage of pins from that used in the straight-through thereby enabling a crossover connection between unlike-labeled pins, as explained in the next paragraph In FIG. 2C, the cable from FIG. 2A is shown assembled with the ports from FIG. 2B. As can be seen in FIG. 2C, in one direction, conductive path 201 connects a positive polarity signal transmitted (Tx+) from pin "c" of port 208 to pin "a" of port 207 where it is received (Rx+). Conductive path 202 connects a negative polarity signal transmitted (Tx−) from pin "f" of port 208 to pin "b" of port 207 where it is received (Rx−). In the reverse direction, conductive path 203 connects a positive polarity signal transmitted (Tx+) from pin "c" of port 207 to pin "a" of port 208 where it is received (Rx+). And, conductive path 204 connects a negative polarity signal transmitted (Tx−) from pin "f" of port 207 to pin "b" of port 208 where it is received (Rx−). Because all of these connections are between different pin designations i.e., from "a" to "c" and from "b" to "1" regardless of which direction the signal is moving, this is known as a "crossover" Ethernet cable and RJ-45 connector. It matters not if the wiring actually twists within the cable as shown, or if the cable itself twists, as long as the pin connections at the ends of the wires within that cable are pins "a" and "c" or pins "b" and "f" as explained above.

FIG. 3 is a schematic diagram of an exemplary arrangement 300 of Ethernet connections that are under test, those connections being to, through, and/or between network elements in a network, the arrangement. Ethernet test-set 301 includes at least two Ethernet ports 302 and 303. Network element 304, which can be, e.g., a network gateway, hub, switch or router, or can include, but not be limited to, an Add/Drop Multiplexer (ADM), a Reconfigurable Optical Add/Drop Multiplexer (ROADM), a Multi-Service Provisioning Platform (MSPP), or a Digital Cross Connect, etc. can include multiple Ethernet ports, one of which is port 307. Communication path 305 represents a test signal transmission path from port 302 in test-set 301 to port 307 in network element 304. Communication path 306 represents a test signal return path from port 307 in network element 304 to port 303 in test-set 301. These test signal transmission and return paths are part of the complete signal path including all Ethernet connections that are under test, those connections being to and through network element 304, and between network element 304 and other network elements in a network. (The complete signal path is included, but not shown, in FIG. 3.)

For example, first network element 304 communicates with second network element 309 by way of transport network 308 which can include, for example, a synchronous optical network (SONET) and/or an optical network transmission (ONT) network or other network. It is possible for transport network to include further Ethernet links, (not shown). Network element 309 can also be, e.g., a network gateway, hub, switch or router, or can include, but not be limited to, an Add/Drop Multiplexer (ADM), a Reconfigurable Optical Add/Drop Multiplexer (ROADM), a Multi-Service Provisioning Platform (MSPP), or a Digital Cross Connect, etc. Network layer one port 312 in network element 304 and network layer one port 313 in network element 309 both interface with transport network 308, thereby establishing a link 314 through network 308 which would be a link between both layer one ports unless the path were changed to conform with other transmission protocol within cloud 308. Link 314 is shown as a straight line solely for ease of illustration but it should be understood that this link can be connected through different networks and network connections/elements and can span many thousands of miles across the United States and beyond. Network element 309 also includes multiple Ethernet ports, one of which is located at the far-end of the test signal path and is shown as port 310 with loop 311 inter-connecting its positive polarity Tx+ and Rx+ pins (not shown) as well as its negative polarity Tx− and Rx− pins (not shown) enabling the transmitted test signal to loop-back, essentially transmitting to itself. (The Tx+, Rx+, Tx− and Rx− pins of port 310 are arranged similarly, or identical, to those in any of the ports shown in FIG. 4.)

FIG. 4 is a schematic diagram of detailed wiring interconnections in a novel Ethernet cable 400 of the type used in the arrangement of FIG. 3. This cable is a crossover cable which is required in order to connect between an Ethernet test-set and a network gateway, hub, switch or router, or an Add/Drop Multiplexer (ADM), a Reconfigurable Optical Add/Drop Multiplexer (ROADM), a Multi-Service Provisioning Platform (MSPP), or a Digital Cross Connect, etc. The cable contains a first set of mutually-insulated conductive paths 401 and 402 which interconnect, respectively, Tx+ on pin "c" and Tx− on pin "f" in first Ethernet test-set port 302 with Rx+ on pin "a" and Rx− on pin "b," respectively, in Ethernet port 307 in first network element 304. The cable also contains a second set of mutually insulated conductive paths 403 and 404 which interconnect, respectively, Tx+ on pin "c" and Tx− on pin "f" in Ethernet port 307 with Rx+ on pin "a" and Rx− on pin "b," respectively, in second Ethernet test-set port 303. The first and second sets of mutually insulated conductive paths are commonly sheathed in cable 400 for the entire length 405 of the cable connecting first network element 304 to Ethernet test-set 301, but for a branching of the cable into two cables 406 at one end of the cable located at Ethernet test-set 301.

In operation, referring to FIGS. 3 and 4 together, a test signal is sent from test-set 301 in communication path 305 via wires 401 and 402. That signal is conducted through the internals of network element 304, which may include additional Ethernet connections, and by which a corresponding network level one signal, such as an optical signal, is obtained and provided to network level one port 312. The network level one signal is then transmitted from port 312 over transport network 308 and eventually to network layer one port 313 located in second network element 309. In second network element 309 the level one signal is converted to an Ethernet signal which is routed within network element 309 to Ethernet port 310 located at the far-end of the test signal path. In port 310, the signal is looped-back because the pins of port 310 are interconnected so that its Tx+pin (not shown) is connected to its Rx+ pin (not shown) and its Tx− pin (not shown) connected to its Rx− pin (not shown). This interconnection causes the Ethernet signal to begin a return trip with the return signal's destination being the Ethernet test-set 301.

The return signal is first converted back to a network level three signal in second network element 309 for transmission from level three port 313 over transport network 308 to be received eventually in level three port 312 in first network element 304. The second, return path through transport network 308 need not be the same as the first, forward path through the network and, indeed, can be substantially different in length and character, and, as noted, the first and second paths can even contain other Ethernet links. But, solid line 314 is provided to show that first and second communication paths, wherever they go, ultimately exist between ports 312 and 313. In first network element 304, the return signal is again changed from a level one signal to an Ethernet signal and transmitted through pins "c" and "f" in port 307 and via wires 403 and 404, respectively, to pins "a" and "b," respectively, in second Ethernet test-set port 303.

FIG. 5 is a schematic diagram of detailed wiring interconnections in a cable 500 as shown in FIG. 4 but with additional inter-connections between ports of an Ethernet cable tester to disengage a no-signal alarm All connections in Fig, 5 are identical to those in FIG. 4 except that connections 501 and 502 of Fig, 5 are added to those in FIG. 4. Connection 501 conductively interconnects the Tx+pin "c" of second Ethernet port 303 in Ethernet test-set 301 with the Rx+pin "a" of first Ethernet port 302 in Ethernet test-set 301. Connection 502 conductively interconnects the Tx+pin "f" of second Ethernet port 303 in Ethernet test-set 301 with the Rx+pin "V of first Ethernet port 302 in Ethernet test-set 301. The purpose of making these connections with these two jumper wires is to provide a connection to the two receive pins of port 302 which would otherwise appear open to test-set 301. These jumper connections over-ride a "no signal received" alarm which otherwise would be energized by test-set 301. This avoids an annoying false alarm while conducting the test. These two jumper wires interconnect pins on both ports 302 and 303 which are otherwise not used in this test procedure and on which there is no signal being transmitted or received, but the connection itself is sufficient to quell the alarm at least for certain kinds of testers. A tester with which this alarm disable is particularly useful is an 1XIA Corporation model 400T or model 1600T tester.

FIG. 6 is a schematic diagram of another exemplary arrangement 600 of network elements under test in relation to an Ethernet test-set and with which another exemplary embodiment. In general, in this arrangement both Ethernet test-set ports 302 and 303 receive return test signals on all of their receive (Rx+ and Rx−) pins, so the pin-jumper feature of the embodiment of FIG. 5 is not needed to quell the no-signal alarm. Advantageously, two network elements, each at the terminus of their respective test signal paths, can be simultaneously tested with the same Ethernet test-set.

In particular, Ethernet test-set 301 is again connected to first network element 304 which, in turn, is again connected to second network element 309, similarly to its connection of FIG. 3. This portion of FIG. 6 involves communication paths 305 and 306, and link 314 through transport network 308, which is identical to what is depicted in FIG. 3, and operates exactly as described above for operation of FIG. 3. Simultaneously with this FIG. 3 related operation, a "mirror-image" operation can take place between Ethernet test-set 301, first network element 304 and third network element 604. Third network element 604 is shown interfacing with transport network 308 which involves a separate test path from that used in FIG. 3.

Communication path 601 represents a third test signal transmission path from port 303 in test-set 301 to port 603 in first network element 304. Communication path 602 represents a fourth test signal return path from port 603 in network element 304 to port 302 in test-set 301. These test signal transmission and return paths are part of the complete second signal path including all Ethernet connections that are under test in that second signal path, those connections being to and through network element 304, and between network element 304 and third network element 604. (The complete second signal path is included, but not shown, in FIG. 6.)

First network element 304 communicates with third network element 604 by way of transport network 308, which can be, for example, a synchronous optical network (SONET) and/or an optical network transmission (ONT) network or other network. Network element 604 can also be, e.g., a network gateway, hub, switch or router, or can include, but not be limited to, an Add/Drop Multiplexer (ADM), a Reconfigurable Optical Add/Drop Multiplexer (ROADM), a Multi-Service Provisioning Platform (MSPP), or a Digital Cross Connect, etc. Network layer one port 605 in network element 304 and network layer one port 609 in network element 604 both interface with transport network 308, thereby establishing a link 608 through network 308 between both layer one ports. Link 608 is shown as a straight line solely for ease of illustration but it should be understood that this link can be connected through different networks and network connections/elements and can span many thousands of miles across the United States and beyond. Network element 604 also includes multiple Ethernet ports, one of which is located at the far-end of the signal path and is shown as port 606 with loop 607 inter-connecting its positive polarity Tx+ and Rx+pins (not shown) as well as its negative polarity Tx− and Rx−pins (not shown). (The Tx+, Rx+, Tx− and Rx− pins of port 606 are arranged similarly, or identical, to those in any of the ports shown in FIG. 7.)

FIG. 7 is a schematic diagram of detailed wiring interconnections in a novel Ethernet cable 700 of the type used in the arrangement of FIG. 6. This cable is also a crossover cable which is required in order to connect between an Ethernet test-set and a network gateway, hub, switch or router, or can include, but not be limited to, an Add/Drop Multiplexer (ADM), a Reconfigurable Optical Add/Drop Multiplexer (ROADM), a Multi-Service Provisioning Platform (MSPP), or a Digital Cross Connect, etc. All of the connections in FIG. 6 that are identical to those in FIG. 3 were previously described in connection with FIG. 3 and won't be repeated. The new connections are as follows.

The cable contains a first set of mutually-insulated conductive paths 701 and 702 which interconnect, respectively, Tx+ on pin "c" and Tx− on pin "f" in second Ethernet test-set port 303 with Rx+ on pin "a" and Rx− on pin "b," respectively, in Ethernet port 707 in first network element 304. The cable also contains a second set of mutually insulated conductive paths 703 and 704 which interconnect, respectively, Tx+ on pin "c" and Tx− on pin "f" in Ethernet port 707 with Rx+ on pin "a" and Rx− on pin "b," respectively, in first Ethernet test-set port 302. The third and fourth sets of mutually insulated conductive paths are commonly sheathed in cable 700 for the entire length 705 or 706 of the cable connecting first network element 304 to Ethernet test-set 301, but for a branching of the cable into two cables, namely cable-pair 708 located at Ethernet test-set 301 and cable-pair 709 located at network element 304.

In operation, referring to FIGS. 6 and 7 together, in addition to that operation described above with respect to FIGS. 3 and 4, a test signal is sent from test-set 301 in communication path 601 via wires 701 and 702. That signal is conducted through the internals of network element 304, which may include additional Ethernet connections, and by which a corresponding network level one signal, such as an optical signal, is obtained and provided to network level one port 605. The network level one signal is then transmitted from port 605 over transport network 308 to network layer one port 609 located in third network element 604. In third network element 604 the level one signal is converted to an Ethernet signal which is routed within network element 604 to Ethernet port 606 located at the far-end of this test signal path which is different from the test signal path associated with network element 309. In port 606, the signal is looped-back because the pins of port 606 are interconnected so that its Tx+ pin (not shown) is connected to its Rx+ pin (not shown) and its Tx− pin (not shown) is connected to its Rx− pin (not shown). This interconnection causes the Ethernet signal to begin a return trip with the return signal's destination being the Ethernet test-set 301.

The return signal is first converted back to a network level three signal in third network element 604 for transmission from level three port 609 over transport network 308 to be received in level three port 605 in first network element 304. The fourth, return path through transport network 308 need not be the same as the third, forward path through the network and, indeed, can be substantially different in length and character, but solid line 608 is provided to show that first and second communication paths exist between ports 605 and 609. In first network element 304, the return signal is again changed from a level one signal to an Ethernet signal and transmitted through pins "c" and "f" in port 603 and via wires 703 and 704, respectively, to pins "a" and "b," respectively, in first Ethernet test-set port 302.

For ease of reference with respect to reading the claims, the following information is a summary of an association between certain terms recited in the claims and reference numbers in the Figs: Support for these terms is not limited to this association. Ethernet test-set first port may be 302; second port may be 303. First mutually insulated conductive paths may be 305; second mutually insulated conductive paths may be 306; third mutually insulated conductive paths may be 601; fourth mutually insulated conductive paths may be 602. First network element may be 304. First network element first port may be 307, second port may be 603. Second network element may be 309. Third network element may be 604. First and second test signal paths may include paths 314. Third and fourth test signal paths may include paths 608.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. Accordingly, the specification and drawings are accordingly to be regarded in an illustrative rather than restrictive sense.

What is claimed is:

1. An Ethernet test-set cable comprising:

first mutually-insulated conductive paths interconnecting a first Ethernet port of an Ethernet test-set and a first Ethernet port of a first network element;

second mutually-insulated conductive paths, sheathed together with said first mutually-insulated conductive paths within said cable, interconnecting said first Ethernet port of said first network element to a second Ethernet port of said Ethernet test-set; and wherein said first conductive paths conduct a test signal from said first Ethernet port of said Ethernet test-set to said first Ethernet port of said first network element which, in turn, forwards said test signal along a first test signal path to a far-end Ethernet port with interconnected transmit and receive pins, said far-end Ethernet port included in a second network element which returns said test signal to said first network element along a second test signal path; and said second conductive paths conduct said returned test signal from said first Ethernet port of said first network element to said second Ethernet port of said Ethernet test-set.

2. The Ethernet test-set cable of claim 1 further comprising:

third mutually-insulated conductive paths, sheathed together with said first conductive paths and said second conductive paths, interconnecting transmit pins of said second. Ethernet port of said Ethernet test-set with receive pins of said first Ethernet port of said Ethernet test-set to disable a no-signal alarm otherwise generated by said Ethernet test-set.

3. The Ethernet test-set cable of claim 1 wherein said first conductive paths and said second conductive paths are sheathed together within said cable for the entire length of said cable connecting said first Ethernet port of said first network element to both said first Ethernet port of said Ethernet test-set and said second Ethernet port of said Ethernet test-set except for a branching of said cable into two cables at one end of said cable located at said Ethernet test-set.

4. The Ethernet test-set cable of claim 1 having both ends of said cable terminated in standard RJ45 connector plugs utilizing cross over cable wiring format, said plugs each having eight pins sequentially designated as pin "a" through pin "h"or as pin "1" through pin "8."

5. The Ethernet test-set cable of claim 4 wherein pins c and f of said first Ethernet port of said Ethernet test-set connect, respectively, to pins a and b of said first Ethernet port of said first network element and pins c and f of said first Ethernet port of said first network element connect, respectively, to pins a and b of said second Ethernet port of said Ethernet test-set.

6. The Ethernet test cable of claim 5 wherein pins c and f of said second Ethernet port of said Ethernet test-set connect, respectively, to pins a and b of said first Ethernet port of said Ethernet test-set.

7. The Ethernet test-set cable of claim 1 further comprising:

third mutually-insulated conductive paths interconnecting said second Ethernet port of said Ethernet test-set and a second Ethernet port of said first network element, said second network element communicatively coupled to a third network element; and fourth mutually-insulated conductive paths, sheathed together with said third paths, said second paths and said first paths within said cable, interconnecting said second Ethernet port of said first network element to said first Ethernet port of said Ethernet test-set.

8. The Ethernet test-set cable of claim 1 further comprising:

third mutually-insulated conductive paths interconnecting said second Ethernet port of said Ethernet test-set and a second Ethernet port of said first network element; and fourth mutually-insulated conductive paths, sheathed together within said third paths, said second paths and said first paths within said cable, interconnecting said second Ethernet port of said first network element to said first Ethernet port of said Ethernet test-set.

9. The Ethernet test-set cable of claim 8 wherein:

said third conductive paths conduct a different test signal from said second Ethernet port of said Ethernet test-set to said second Ethernet port of said first network element which, in turn, forwards said different test signal along a third test signal path to a third network element which returns said different test signal to said first network element along a fourth test signal path; and said fourth conductive paths conduct said returned different test signal from said. second Ethernet port of said first network element to said first Ethernet port of said Ethernet test-set.

10. The Ethernet test-set cable of claim 1 further comprising:

third mutually-insulated conductive paths interconnecting said second Ethernet port of said Ethernet test-set and a second Ethernet port of said first network element;

fourth mutually-insulated conductive paths interconnecting said second Ethernet port of said first network element to said first Ethernet port. of said Ethernet test-set;

wherein said first conductive paths, said second conductive paths, said third conductive paths and said fourth conductive paths are sheathed together within the protective exterior of said cable for the entire length of said cable connecting said first port of said first network element to both said first port of said Ethernet test-set and said second port of said Ethernet test-set and connecting said second port of said first network element to both said second Ethernet port of said Ethernet test-set and said first Ethernet port of said Ethernet test-set, except for a branching of said cable into two cables at both ends of said cable for connecting to said Ethernet test-set and said first network element.

11. The Ethernet test cable of claim 10 having both ends of said cable terminated in standard RJ45 connector plugs utilizing cross over cable wiring format.

12. The Ethernet test cable of claim 11 wherein:

pins c and f of said first Ethernet port of said Ethernet test-set connect, respectively, to pins a and b of said first Ethernet port of said first network element and pins c and f of said first Ethernet port of said first network element connect, respectively, to pins a and b of said second Ethernet port of said Ethernet test-set; and pins c and f of said second Ethernet port of said Ethernet test-set connect, respectively, to pins a and b of said second Ethernet port of said first network element and pins c and f of said second. Ethernet port of said first network element connect, respectively, to pins a and b of said first Ethernet port of said Ethernet test-set.

13. A method for testing Ethernet cables les and their connections comprising:

transmitting a first test signal from a first Ethernet port of an Ethernet test-set to a first Ethernet port of a first network element within an Ethernet cable over first mutually insulated conductive paths;

transmitting said first test signal along a first test signal path from said first network element to a far-end Ethernet port with interconnected transmit and receive pins, said far-end Ethernet port included in a second network element, said second network element returning said first test signal to said first network element along a second test signal path, said first test signal path and said second test signal path together including said Ethernet cables and their connections; and returning: said first test signal from said first Ethernet port of said first network element to a second Ethernet port of said Ethernet test-set over second mutually insulated conductive paths bundled together with said first mutually insulated conductive paths within said cable for the entire length of said cable except for an end of said cable which is unbundled into two cables at the location of said Ethernet test-set.

14. The method of claim 13 further comprising interconnecting pins on said second Ethernet port of said Ethernet test-set with other pins on said first Ethernet port of said Ethernet test-set to inhibit an alann on said Ethernet test-set which would otherwise be activated to signify that a signal has not been received at said first Ethernet port of said Ethernet test-set 15. The method of claim 13 further comprising:

transmitting a second test signal from said second Ethernet port of said Ethernet test-set to a second Ethernet port of said first network element within said portion of said cable over third mutually insulated conductive paths;

transmitting said second test signal from said first network element to a third network element along a third test signal path, said third network element returning said second test signal to said first network element along a. fourth test signal path, said third test signal path and said fourth test signal path together with said first test signal path and said second test signal path collectively including said Ethernet cables and their connections; and returning said second test signal from said second Ethernet port of said first network element to a first Ethernet: port of said Ethernet test-set over fourth mutually insulated conductive paths bundled together with said third mutually insulated conductive paths, said second mutually insulated conductive paths and said first mutually insulated conductive paths within said cable for the entire length of said cable except for both ends of said cable which are unbundled into two cables at the locations of said Ethernet test-set and said first network element.

16. The method of claim 13 further comprising;

looping back said first test signal by interconnecting certain pins on a terminus Ethernet port to each other, said terminus port included in said second network element wherein a Tx+pin is connected to an Rx+pin and a Tx−pin is connected to an Rx−pin.

17. The method of claim 13 wherein said first test signal path includes connections between layer one connection ports located in said first network element and said second network element, and said second test signal path includes connections between other layer one connection ports located in said first network element and said second network element.

18. The method of claim 17 wherein said first test signal path and said second test signal path includes paths through a transport network.

19. The method of claim 18 wherein said layer one connection ports are selected from the group of ports compatible with SONET protocol and OTN protocol.

20. A method for testing Ethernet cables and their connections comprising:

connecting one end of an Ethernet cable to an Ethernet port of a first network element which is connected to other network elements over a network;

connecting two other ends of said Ethernet cable to two Ethernet ports, respectively, of an Ethernet test-set which controls said testing;

sending a test signal from one of said two Ethernet ports over said cable to said Ethernet port of said first network element; and receiving said test signal from said Ethernet port of said first network element over said cable in the other of said two Ethernet ports in said Ethernet test-set.

21. The method of claim 20 wherein said test signal travels from said first network element along a test signal path to a far-end Ethernet port having its transmit and receive pins interconnected, said far-end port being located at the far-end of said test signal path and within one of said other network elements.

22. An Ethernet test-set cable comprising:

first mutually-insulated conductive paths interconnecting a first Ethernet port of an Ethernet test-set and a first Ethernet port of a first network element;

second mutually-insulated conductive paths, sheathed together with said first mutually-insulated conductive paths within said cable, interconnecting said first Ethernet port of said first network element to a second Ethernet port of said Ethernet test-set; and third mutually-insulated conductive paths, sheathed together with said first conductive paths and said second conductive paths, interconnecting transmit pins of said second Ethernet port of said Ethernet test-set with receive pins of said first Ethernet port of said Ethernet test-set to disable a no-signal alarm otherwise generated by said Ethernet test-set.

* * * * *